United States Patent
Feldman et al.

(10) Patent No.: US 8,099,616 B2
(45) Date of Patent: Jan. 17, 2012

(54) POWER OVER ETHERNET PORT ENABLING AND DISABLING RESPONSIVE TO ACCESS CONTROL SYSTEM

(75) Inventors: Daniel Feldman, Mountain View, CA (US); Ezra Koper, Gan Yavne (IL); David Pincu, Holon (IL); Simon Kahn, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 564 days.

(21) Appl. No.: 12/350,249

(22) Filed: Jan. 8, 2009

(65) Prior Publication Data

US 2009/0112373 A1 Apr. 30, 2009

Related U.S. Application Data

(63) Continuation-in-part of application No. 11/752,939, filed on May 24, 2007, now Pat. No. 7,814,357.

(60) Provisional application No. 60/804,453, filed on Jun. 12, 2006.

(51) Int. Cl.
*G06F 1/00* (2006.01)

(52) U.S. Cl. ........................ 713/324; 713/300

(58) Field of Classification Search .................. 713/324, 713/300
See application file for complete search history.

(56) References Cited

U.S. PATENT DOCUMENTS

| 4,255,787 | A | 3/1981 | Hoffmann et al. |
| 6,909,941 | B2 | 6/2005 | Scott et al. |
| 7,515,526 | B2 * | 4/2009 | Elkayam et al. ............. 370/217 |
| 2005/0197742 | A1 | 9/2005 | Scott et al. |
| 2007/0067065 | A1 | 3/2007 | El-Gasseir et al. |

\* cited by examiner

*Primary Examiner* — Nitin Patel
(74) *Attorney, Agent, or Firm* — Haynes and Boone, LLP (57) ABSTRACT

An electronically controlled method of controlled enabling and disabling of ports, the method constituted of: receiving a message responsive to an access event, the message comprising an identifier of the accessing party and an indication of the access event; determining at least one power over Ethernet supplying port associated with the identifier of the accessing party; and enabling, in the event the indication of the access event is of entry, the determined at least one power over Ethernet supplying port associated with the identifier of the accessing party; and disabling, in the event the indication of the access event is of exit, the determined at least one power over Ethernet supplying port associated with the identifier of the accessing party.

8 Claims, 6 Drawing Sheets

POWER OVER ETHERNET PORT ENABLING AND DISABLING RESPONSIVE TO ACCESS CONTROL SYSTEM

CROSS-REFERENCE TO RELATED APPLICATIONS

This application is a continuation-in-part of U.S. patent application Ser. No. 11/752,939, filed May 24, 2007, which claims priority from U.S. Provisional Patent Application Ser. No. 60/804,453 to Koper et al, filed Jun. 12, 2006, the entire contents of both of which are incorporated herein by reference.

TECHNICAL FIELD

The present invention relates to power control, and more particularly to a method and apparatus arranged to alternately enable and disable Power over Ethernet ports responsive to access control system events.

BACKGROUND

The growth of local and wide area networks based on Ethernet technology has been an important driver for cabling offices and homes with structured cabling systems having multiple twisted wire pairs. The structured cable is also known herein as communication cabling and typically comprises four twisted wire pairs. In certain networks only two twisted wire pairs are used for communication, with the other set of two twisted wire pairs being known as spare pairs. In other networks all four twisted wire pairs are used for communication. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management. A good portion of modern office telephone systems are implemented as voice over Internet protocol (VoIP) telephones, powered by PoE, thus providing for the above mentioned benefits.

The IEEE 802.3af-2003 standard, published by the Institute of Electrical and Electronics Engineers, Inc, New York, whose entire contents are incorporated herein by reference, is addressed to powering remote devices over an Ethernet based network. Power can be delivered to the powered device (PD) either from a power sourcing equipment (PSE) associated with the switch/hub known as an endpoint PSE or alternatively via a midspan PSE connected between the switch/hub equipment and the PD. A PSE as used in this document may supply power over Ethernet to one or more ports, and a single PSE is defined as power sourcing equipment contained in a single chassis. In either case power is delivered over a set of two twisted pairs of wires. PoE ports of either a midspan PSE or an endpoint PSE can typically be remotely controlled from a management station. In one embodiment, each port may be controlled to one of an enabled state, in which a powered device is automatically detected if attached thereto and powered, and a disabled state in which detection does not occur. In yet another embodiment each port in a disabled state performs detection on a periodic basis, however a detected PD is not powered. The popularity of the above mentioned standard has led to a demand for increased power to the PD, resulting in the formation of the IEEE P802.3 at DTE Power Enhancements Task Force.

PDs comprise a whole host of data terminal units for which power is advantageously delivered via the communication cabling. Specific examples of PDs include VoIP telephones, wireless access points (WAPs) and access control devices.

Wiring of a system according to the IEEE 802.3 standard, published by the Institute of Electrical and Electronics Engineers, Inc, New York the entire contents of which is incorporated herein by reference, typically comprises cables terminated at a work area in a telecommunications outlet/connector (TO) as defined by TIE/EIA 568 published by the Telecommunications Industry Association 2001 of Arlington, Va., and by ISO/IEC 11801 published by the International Organization for Standardization and the International Electrotechnical Commission, Geneva, Switzerland, the entire contents of both of which are incorporated herein by reference. The TO is connected via horizontal cabling, optionally through at most one each of a transition or consolidation point, a user patch panel and an equipment patch panel to the common equipment which typically comprises a switch/hub or bridge. Optionally, a midspan device may be connected between the common equipment and one user patch panel to provide power. The connections between the common equipment and the TO may be changed by rearranging patch cords connected between any of the common equipment, the user patch panel and the equipment patch panel. In an installation in which both a user patch panel and an equipment patch panel are provided, or a midspan device and a user patch panel are provided, the connections between the common equipment and the TO are typically changed by rearranging patch cords between the equipment patch panel or the midspan device and the user patch panel.

Access control systems are often installed to enable control accessed by authorized individuals and deny access to others. Electronically implemented access control systems enable access to such premises without requiring a human guard. Access control systems may be implementation, without limitation, by smart cards, bar coded access strips, or punch in codes, thus enabling access at any hour or day. Access control systems are typically supplied as stand alone systems, controlling and recording access events.

Office hours and business days are well known features of the work week. Office security is improved by a scheduled disabling of PoE ports during hours and/or days which are not scheduled for work, thereby disabling WAPs and optionally PoE powered telephones, when the office is not populated. Additionally, power can be saved by disabling PoE ports during non-business days, and/or non-office hours. Such a scheduled disabling is preferably accomplished from a management station operable by authorized personnel. Unfortunately, a user who unexpectedly requires the use of a PD, such as a WAP, which is connected to a scheduled disabled port finds the PD inoperable irrespective of the user being granted access by the access control system. The user may not have access to the management station which has set the port to be disabled.

It is further desirable to maximize the amount of power saved, by shutting down power to unused PoE ports whenever practicable.

SUMMARY

In view of the discussion provided above and other considerations, the present disclosure provides methods and apparatus to overcome some or all of the disadvantages of prior and present PoE port enablement methods and apparatuses. Other new and useful advantages of the present methods and apparatus will also be described herein and can be appreciated by those skilled in the art.

This is provided in certain embodiments by a PoE system in communication with an access control system and further in communication with a database providing cross reference information between access control data and PoE ports. Responsive to an authorized access event, the access control system transmits a message to the PoE system, comprising identification information of the accessing party and an indication of the access event. The PoE system, responsive to the transmitted identification information obtains the PoE port information via the cross reference database, and further enables or disables at least one PoE port responsive to the access event.

In one embodiment the at least one port is associated with a VoIP telephone of the accessing party. In another embodiment, the at least one port is associated with lighting, and optionally a climate control system, for the area associated with the workspace of the accessing party. In yet another embodiment, the at least one port is associated with lighting a path from the access event location to workspace area.

In one embodiment the database is stored associated with the PoE system, and in particular with a PoE management system. In another embodiment, the database is stored within the computer network to which the PoE management system has access.

Thus, a PoE port associated with a particular accessing party is powered responsive to an access event associated with the accessing party, and power is removed responsive to an exit event associated with the accessing party.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 illustrates a high level block diagram of a user interface for a scheduled enabling and disabling of ports and an override mechanism;

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
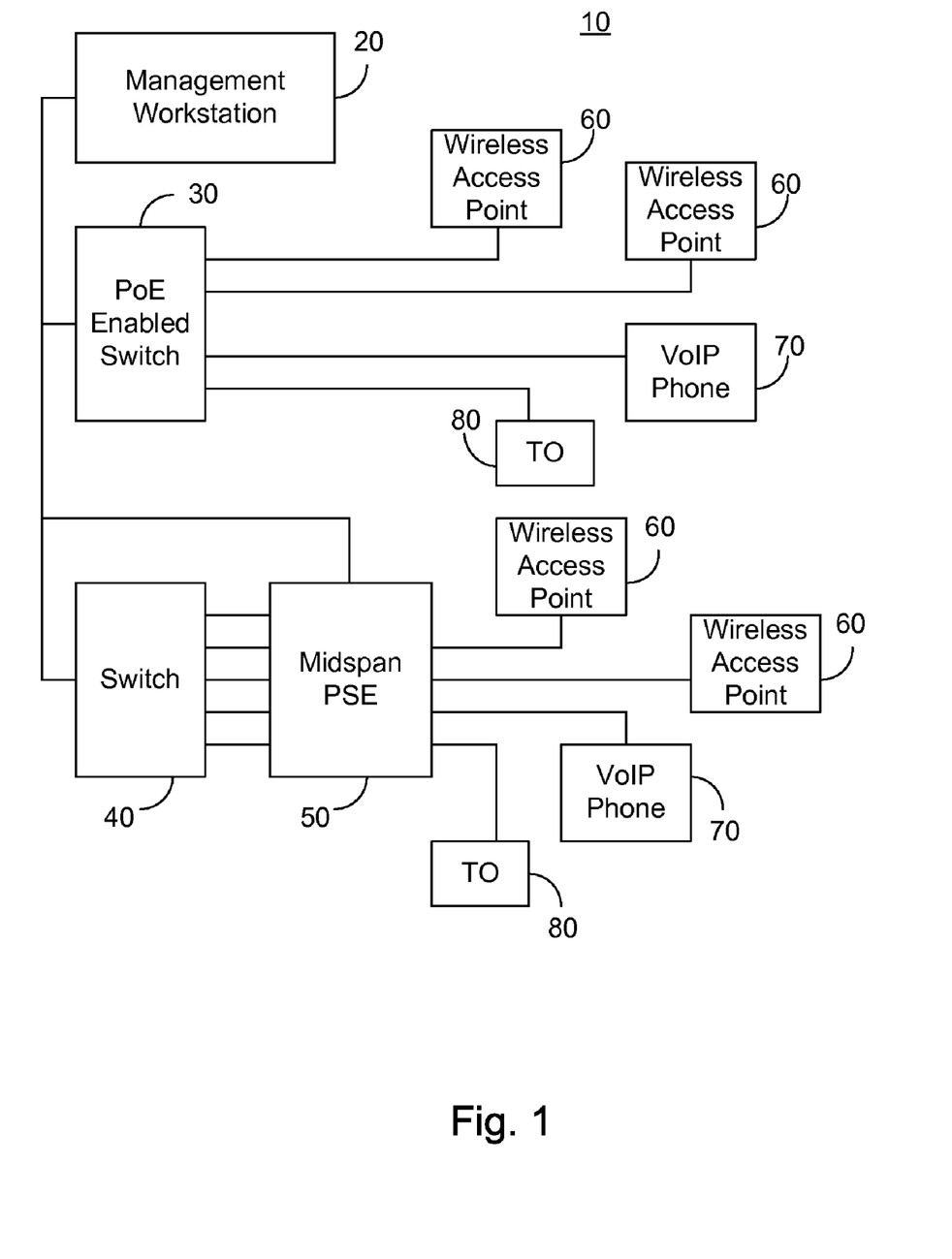
FIG. 1 illustrates a high level block diagram of an embodiment of a PoE system having a plurality of ports and a management workstation running a network management system, the PoE system exhibiting at least one telecommunications outlet (TO) designated as an override key port.

FIG. 1 illustrates a high level block diagram of a first embodiment of a PoE system, designated PoE system 10, having a plurality of ports and a management workstation running a network management system, the PoE system exhibiting at least one monitored telecommunications outlet designated as an override key port. PoE system 10 comprises: a management work station 20; a PoE enabled switch 30; a switch 40; a midspan PSE 50; a plurality of WAPs 60; a plurality of VoIP telephones 70; and a plurality of TOs 80 which are designated as an override key port. It is it to be understood that in a typical embodiment of PoE system 10 each VoIP telephone 70 and WAP 60 are connected via an associated TO, such as an RJ-45 jack. Each TO 80 is distinguished by having no PD or other data terminal device connected thereto and being designated as will be described further hereinto below as an override key port.

Management work station 20 is connected through a network connection, either physical or logical, to PoE enabled switch 30, switch 40 and midspan PSE 50. PoE enabled switch 30 exhibits a plurality of ports, some of the plurality of ports being connected to a respective WAP 60, VoIP telephone 70 and TO 80. Switch 40 exhibits a plurality of ports; at least some of the ports of switch 40 are connected to midspan PSE 50. Midspan PSE 50 exhibits a plurality of ports; some of the plurality of ports being connected to a respective WAP 60, VoIP telephone 70 and TO 80.

In operation, PoE enabled switch 30 provides data communication and supplies power over the data communication cabling for each WAP 60 and VoIP phone 70 connected thereto. PoE enabled switch 30 reports all powering events to management workstation 20, and further each port for which PoE enabled switch 30 supplies power to a connected PD may be enabled or disabled under control of management workstation 20. In one embodiment when a PoE supplying port of PoE enabled switch 30 is disabled, PoE enabled switch 30 does not act to periodically attempt to detect a valid PD connected to the disabled port. In another embodiment PoE enabled switch 30 continues to periodically attempt to detect a valid PD connected to the disabled PoE supplying port, however power is not supplied irrespective of the results of the detection. PoE enabled switch 30 further acts to periodically attempt to detect a valid PD connected to TO 80, preferably in accordance with the detection protocol of IEEE 802.3af-2003 reference above, and to report the results of the detection attempt to management workstation 20.

Switch 40 provides data communication for each WAP 60 and VoIP phone 70 connected thereto via midspan PSE 50. Midspan PSE 50 provides power over the data communication cabling for each WAP 60 and VoIP phone 70 connected thereto. Midspan PSE 50 reports all powering events to management workstation 20, and further each port for which midspan PSE 50 supplies power to a connected PD may be enabled or disabled under control of management workstation 20. In one embodiment when a PoE supplying port of midspan PSE 50 is disabled, midspan PSE 50 does not act to periodically attempt to detect a valid PD connected to the disabled port. In another embodiment midspan PSE 50 continues to periodically attempt to detect a valid PD connected to the disabled PoE supplying port, however power is not supplied irrespective of the results of the detection. Midspan PSE 50 further acts to periodically attempt to detect a valid PD connected to TO 80, preferably in accordance with the detection protocol of IEEE 802.3af-2003 reference above, and to report the results of the detection attempt to management workstation 20.

Management workstation 20 is operative to disable at least one designated port of PoE enabled switch 30 or midspan PSE 50 on a predetermined scheduled basis. Management workstation 20 is further operative upon receiving a report from PoE enabled switch 30 or midspan PSE 50 of a valid PD being detected on a selected TO 80 to override the scheduled disabling of at least one port of PoE enabled switch 30 and/or midspan PSE 50. In an exemplary embodiment a PD which has functionality limited to being detected as a powered device and maintaining parameters indicative of connection is connected by a user to a TO 80 thereby prompting management workstation 20 to override the scheduled disabling of at least one port. A PD exhibiting such limited functionality is available as a PowerDsine® PoE Tester available from Microsemi Corporation, Garden Grove, Calif.

Figure 2A:
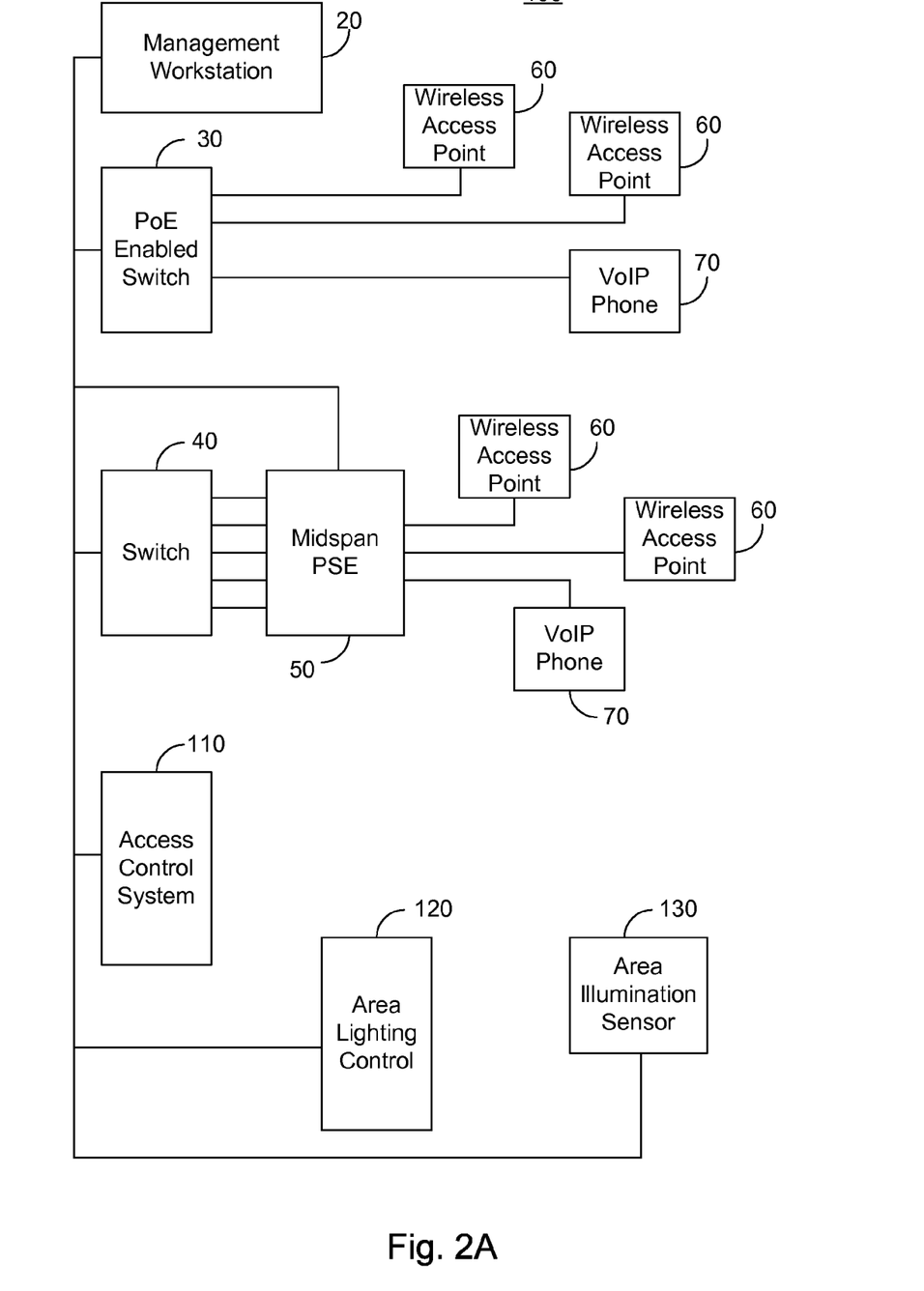
FIG. 2A illustrates a high level block diagram of an embodiment of a PoE system having a plurality of ports and a management workstation running a network management system, the PoE system exhibiting a connection to at least one of an access control system, an area lighting control and a local area illumination sensor.

FIG. 2A illustrates a high level block diagram of a second embodiment of a PoE system, designated PoE system 100, having a plurality of ports and a management workstation running a network management system, the PoE system exhibiting a connection to at least one of an access control system, an area lighting control and a local area illumination sensor. PoE system 100 comprises: a management work station 20; a PoE enabled switch 30; a switch 40; a midspan PSE 50; a plurality of WAPs 60; a plurality of VoIP telephones 70; an access control system 110; an area lighting control 120; and an area illumination sensor 130. It is to be understood that in a typical embodiment of PoE system 100 each VoIP telephone 70 and wireless access point 60 are connected via an associated TO, such as an RJ-45 jack.

Management work station 20 is connected through a network connection, either physical or logical, to PoE enabled switch 30, switch 40, midspan PSE 50, access control system 110, area lighting control 120 and area illumination sensor 130. PoE enabled switch 30 exhibits a plurality of ports, some of the plurality of ports being connected to a respective WAP 60 or VoIP telephone 70. Switch 40 exhibits a plurality of ports; at least some of the ports of switch 40 are connected to midspan PSE 50. Midspan PSE 50 exhibits a plurality of ports; some of the plurality of ports being connected to a respective WAP 60 and VoIP telephone 70.

In operation, PoE enabled switch 30 provides data communication and supplies power over the data communication cabling for each WAP 60 and VoIP phone 70 connected thereto. PoE enabled switch 30 reports all powering events to management workstation 20, and further each port for which PoE enabled switch 30 supplies power to a connected PD may be enabled or disabled under control of management workstation 20. In one embodiment when a PoE supplying port of PoE enabled switch 30 is disabled, PoE enabled switch 30 does not act to periodically attempt to detect a valid PD connected to the disabled port. In another embodiment PoE enabled switch 30 continues to periodically attempt to detect a valid PD connected to the disabled PoE supplying port, however power is not supplied irrespective of the results of the detection.

Switch 40 provides data communication for each WAP 60 and VoIP phone 70 connected thereto via midspan PSE 50. Midspan PSE 50 provides power over the data communication cabling for each WAP 60 and VoIP phone 70 connected thereto. Midspan PSE 50 reports all powering events to management workstation 20, and further each port over which midspan PSE 50 supplies power to a connected PD may be enabled or disabled under control of management workstation 20. In one embodiment when a PoE supplying port of midspan PSE 50 is disabled, midspan PSE 50 does not act to periodically attempt to detect a valid PD connected to the disabled port. In another embodiment midspan PSE 50 continues to periodically attempt to detect a valid PD connected to the disabled PoE supplying port, however power is not supplied irrespective of the results of the detection.

Access control system 110 is operative to enable and record access of authorized personnel to the premises. Upon an authorized entry or exit event noted by access control system 110 a respective message is sent to management workstation 20. Area lighting control 120 is operative to enable illumination of one or more zones under control of one or more switches. Area lighting control 120 is further operative to send a respective message to management workstation 20 reporting on the illumination of a specific zone or zones. Area illumination sensor 130 is operative to sense illumination of one or more zones and to send a report to management workstation 20 reporting on the sensed illumination of a specific zone or zones.

It is to be understood that access control 110, area lighting control 120 and area illumination sensor 130 are each individually optional, and any combination of elements may be supplied without exceeding the scope of the invention. Additionally, other elements indicative of access or entry may be utilized without exceeding the scope of the invention, including but not limited to a motion detector. Additionally, PoE system 100 may be designed in zones, with a first group of power over Ethernet supplying ports from one or more of PoE enabled switch 30 and midspan PSE 50 covering a first portion of space and a second group of power over Ethernet supplying ports from one or more of PoE enabled switch 30 and midspan PSE 50 covering a second portion of space. In one embodiment, in an office premises occupying a plurality of floors, disabling and enabling of ports as will be described further hereinto below, may be accomplished by floors. In another embodiment, in an office premises occupying a large floor area which can be conveniently broken into zones, disabling and enabling of ports as will be described further hereinto below, may be accomplished by zones.

Management workstation 20 is operative to disable at least one designated port of PoE enabled switch 30 or midspan PSE 50 on a predetermined scheduled basis. Management workstation 20 is further operative upon receiving a report from one or more of access control system 110, area lighting control 120 and area illumination sensor 130 to override the scheduled disabling of at least one port of PoE enabled switch 30 and/or midspan PSE 50. As described above, both the scheduled disabling and the override thereof may be done by zones, groups or floors. In one non-limiting example a production area may have the PoE supplying ports enabled and disabled on a first schedule and the management area may have a second group of PoE supplying ports enabled and disabled on a second schedule. PoE supplying ports of the production floor may be enabled overriding the scheduled disabling of ports responsive to a report from access control system 110 upon authorized entry of a production employee, while the PoE supplying ports of the management area may remain disabled according to the second pre-determined schedule. PoE supplying ports of the management area may be enabled overriding the scheduled disabling of ports responsive to a report from access control system 110 upon authorized entry of a management employee, while the PoE supplying ports of the production floor may remain disabled according to the first pre-determined schedule.

Figure 2B:
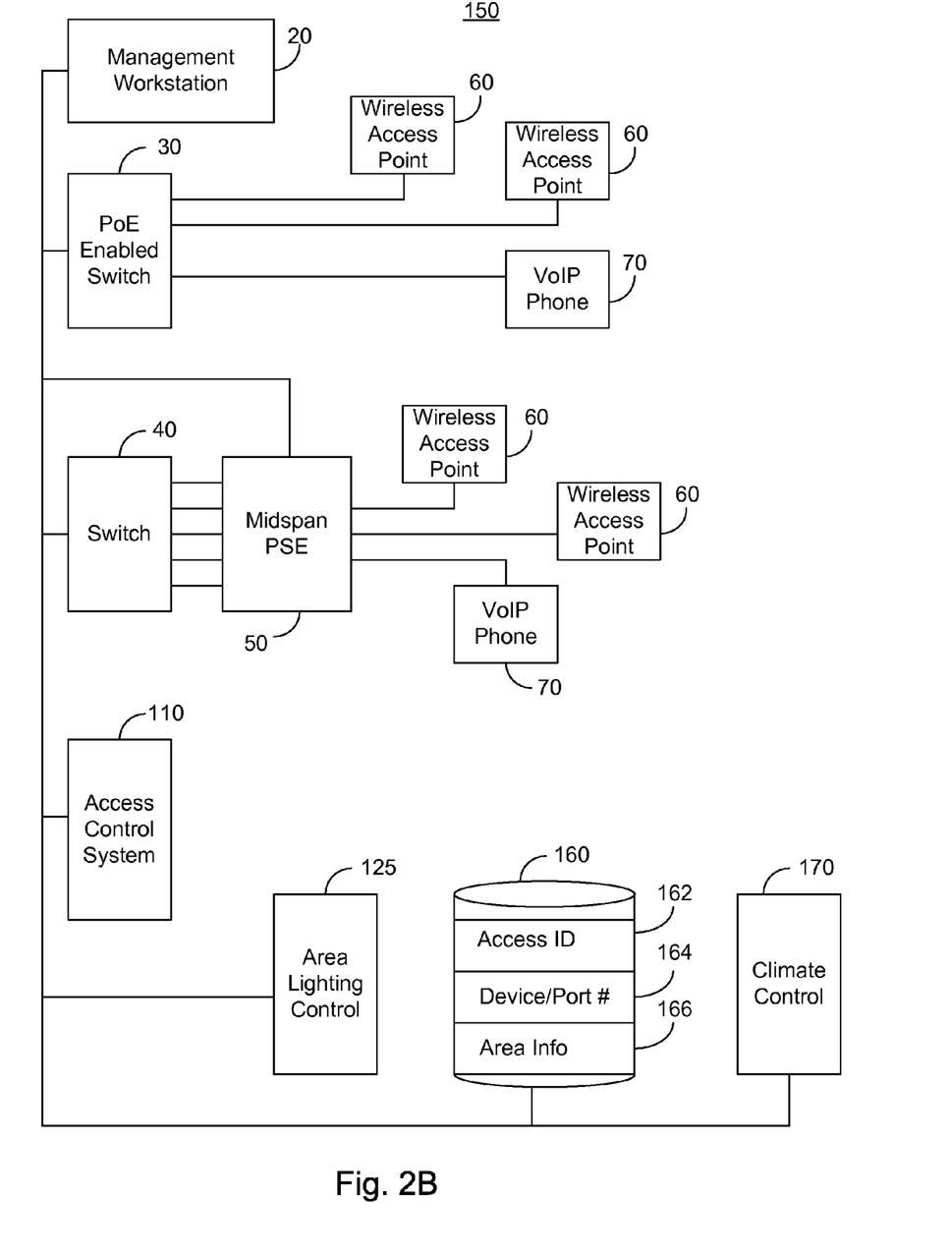
FIG. 2B illustrates a high level block diagram of an embodiment of a PoE system having a plurality of ports and a management workstation running a network management system, the PoE system alternately enabling and disabling at least one PoE port responsive to entry and exit events reported by an access control system.

FIG. 2B illustrates a high level block diagram of an embodiment of a PoE system, designated PoE system 150, having a plurality of ports and a management workstation running a network management system, the PoE system alternately enabling and disabling at least one PoE port responsive to entry and exit events reported by an access control system. PoE system 150 comprises: a management work station 20; a PoE enabled switch 30; a switch 40; a midspan PSE 50; a plurality of WAPs 60; a plurality of VoIP telephones 70; an access control system 110; an area lighting control 125; a database 160; and a climate control system 170. Database 160 preferably comprises identification information 162 associated with access control system 110, port/device number information 164 and optionally area information 166.

Management work station 20 is connected through a network connection, either physical or logical, to PoE enabled switch 30, switch 40, midspan PSE 50, access control system 110, area lighting control 125, database 160 and climate control system 170. Database 160 is thus illustrated as an independent device, however this is not meant to be limiting in any way. In one embodiment database 160 is incorporated within management workstation 20, and in another embodiment database 160 is incorporated within access control system 110. Management workstation 20 may be a stand alone unit, or incorporated within one of midspan PSE 50 and PoE enabled switch 30 without exceeding the scope.

PoE enabled switch 30 exhibits a plurality of ports, some of the plurality of ports being connected to a respective WAP 60 or VoIP telephone 70. Switch 40 exhibits a plurality of ports; at least some of the ports of switch 40 are connected to midspan PSE 50. Midspan PSE 50 exhibits a plurality of ports; some of the plurality of ports being connected to a respective WAP 60 and VoIP telephone 70.

In operation, PoE enabled switch 30 provides data communication and supplies power over the data communication cabling for each WAP 60 and VoIP phone 70 connected thereto. PoE enabled switch 30 reports all powering events to management workstation 20, and further each port for which PoE enabled switch 30 supplies power to a connected PD may be enabled or disabled under control of management workstation 20. In one embodiment when a PoE supplying port of PoE enabled switch 30 is disabled, PoE enabled switch 30 does not act to periodically attempt to detect a valid PD connected to the disabled port. In another embodiment PoE enabled switch 30 continues to periodically attempt to detect a valid PD connected to the disabled PoE supplying port, however power is not supplied irrespective of the results of the detection.

Switch 40 provides data communication for each WAP 60 and VoIP phone 70 connected thereto via midspan PSE 50. Midspan PSE 50 provides power over the data communication cabling for each WAP 60 and VoIP phone 70 connected thereto. Midspan PSE 50 reports all powering events to management workstation 20, and further each port over which midspan PSE 50 supplies power to a connected PD may be enabled or disabled under control of management workstation 20. In one embodiment when a PoE supplying port of midspan PSE 50 is disabled, midspan PSE 50 does not act to periodically attempt to detect a valid PD connected to the disabled port. In another embodiment midspan PSE 50 continues to periodically attempt to detect a valid PD connected to the disabled PoE supplying port, however power is not supplied irrespective of the results of the detection.

Access control system 110 is operative to enable and record access of authorized personnel to the premises. Upon an authorized entry or exit event of an authorized party noted by access control system 110, a respective message is sent to management workstation 20, including identification information associated with the accessing party and an indication of whether the event was an entry event or an exit event.

Management workstation 20 is operative responsive to an entry event message sent by access control system 110, to query database 160, and receive, responsive to an identification of a matching identifier in identification information 162 of database 160, device and port information associated with the accessing party from port/device number information 164 of database 160. In one embodiment, the device and port information identifies the port connected to VoIP phone 70 of the accessing party, particularly identifying the device, such as midspan PSE 50, or PoE enabled switch 30, and the respective port identifier. Thus, the VoIP phone 70 associated with the accessing party is enabled responsive to the entry event recorded by access control system 110.

In one embodiment, a particular WAP 60 is further associated with the accessing party, and the device and port information associated with the particular WAP 60 of the accessing party is further retrieved from port/device number information 164 of database 160 and enabled. In one embodiment, area lighting control 125 is further responsive to management workstation 20. Management workstation 20 is operative to retrieve from optional area information 166 of database 160 identities of a lighting zone, or lighting zones, to be enabled associated with the accessing party, and responsive to the retrieved lighting zone identities to enable the identified lighting zone or zones. In one particular embodiment, a lighting path from the access event location to the work area associated with the accessing party is further enabled.

In one embodiment, climate control system 170 is further responsive to management workstation 20. Management workstation 20 is operative to retrieve from optional area information 166 of database 160 identities of a climate control zone, or zones, to be enabled associated with the accessing party, and responsive to the retrieved climate control zone identities to enable climate control for the identified climate control zone or zones.

Similarly, management workstation 20 is operative responsive to an exit event message sent by access control system 110, to query database 160, and receive, responsive to an identification of a matching identifier in identification information 162 of database 160, device and port information associated with the exiting party from port/device number information 164 of database 160. In one embodiment, the device and port information identifies the port connected to VoIP phone 70 of the exiting party, particularly identifying the device, such as midspan PSE 50, or PoE enabled switch 30, and the respective port identifier. Thus, the VoIP phone 70 associated with the accessing party is disabled responsive to the exit event recorded by access control system 110.

In one embodiment, a particular WAP 60 is further associated with the exiting party, and the device and port information associated with the particular WAP 60 of the exiting party is further retrieved from port/device number information 164 of database 160 and disabled. In one embodiment, area lighting control 125 is further responsive to management workstation 20. Management workstation 20 is operative to retrieve from optional area information 166 of database 160 identities of a lighting zone, or lighting zones, to be disabled associated with the exiting party, and responsive to the retrieved lighting zone identities to disable the identified lighting zone or zones. In one particular embodiment, a lighting path from the access event location to the work area associated with the exiting party which was enabled upon entry is further disabled.

In one embodiment, climate control system 170 is further responsive to management workstation 20. Management workstation 20 is operative to retrieve from optional area information 166 of database 160 identities of a climate control zone, or zones, to be disabled associated with the exiting party, and responsive to the retrieved climate control zone identities to disable climate control for the identified climate control zone or zones. The term disable as regarding climate controlled zones is not meant to be limited to completely disabling the system. In one embodiment the range of allowed temperatures during access events when the system is enabled is controlled to be within a first predetermined range, and the range of allowed temperatures when the system is disabled is controlled to be within a second predetermined range.

FIG. 3 illustrates a high level block diagram of a user interface 200 for a scheduled enabling and disabling of ports and an override mechanism. User interface 200 represents computer operable code for implementation on management workstation 20. User interface 200 comprises: an overall enabling field 210; an entry event override field 220; a weekly schedule field 230; and a port assignment field 240.

Overall enabling field 210 when selected as shown enables the operation of the scheduled enabling and disabling of ports. When overall enabling field 210 is not selected the scheduled enabling and disabling of ports does not occur.

Entry event override field 220 allows for the selection of an override event which is monitored, and its presence overrides the scheduled disabling of ports. In one embodiment a specific pre-selected PoE supplying port may be selected, illustrated as port #5, as described above in relation to the operation of FIG. 1. In another embodiment any authorized entry event is accepted to override the scheduled disabling of ports. In yet another embodiment a specific lighting zone, representing either a zone of area lighting control 120 or area illumination sensor 130 of FIG. 2 is selected to override the scheduled disabling of ports.

Weekly schedule field 230 allows the user to select PoE supplying ports to be disabled for specific hours each day of the week. Thus, in the illustration shown, ports which are to be enabled and disabled according to the schedule are enabled on Monday from 08:00 through 18:59, on Tuesday from 08:00 through 18:59, on Wednesday from 08:00 through 18:59, on Thursday from 08:00 through 18:59 and on Friday from 08:00 through 20:59. The ports are disabled according to the schedule at all other times.

Port assignment field 240 allows the user to select which PoE supplying ports are to be included in the scheduled disabling and enabling of weekly schedule field 230. Thus, in the illustration shown, ports 1, 3, 4, 11, 14, 15, 18, 19, 40, 42 and 43 are enabled and disabled according to the schedule of weekly schedule field 230. PoE supplying ports which are not checked are operative to supply power at all times. Thus, emergency telephone service may be supplied during a scheduled disabling of ports by deselecting ports to which VoIP telephones are connected.

Figure 4:
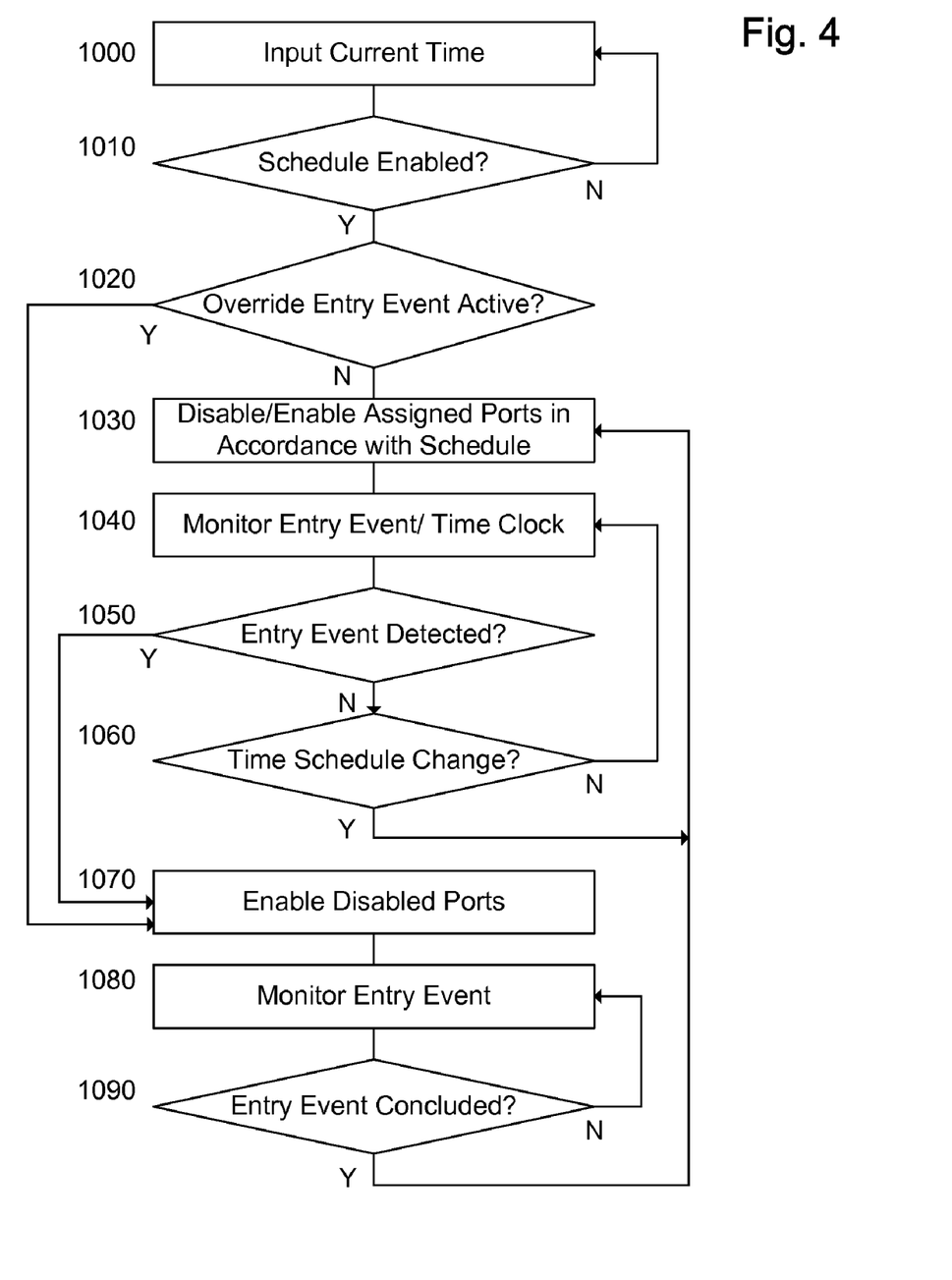
FIG. 4 illustrates a high level flow chart of the operation of the management workstation of FIGS. 1, 2A and 2B to enable and disable ports on a scheduled basis and override the scheduled disabling, in accordance with a principle of the current invention.

FIG. 4 illustrates a high flow chart of the operation of the management workstation of FIGS. 1, 2A and 2B to disable and enable ports on a scheduled basis, and override the scheduled disabling. In stage 1000 the current time is input and in stage 1010 the input received via user interface 200 in overall enabling field 210 is inspected to determine whether the schedule is enabled. In the event that in stage 1010 the schedule is not enabled stage 1000 is again performed, preferably after a predetermined delay.

In the event that in stage 1010 the schedule is enabled, in stage 1020 override entry event as indicated in entry event override field 220 is inspected to determine whether an override event is enabled, and whether the enabled indicated override event is present, or active. For example, access control system 110 may be polled to indicate that all authorized employees have clocked out, area lighting control 120 may be polled to confirm that all lighting zones have been turned off, or area illumination sensor 130 may be polled to indicate that no lights are illuminated in selected zones. Alternatively, the PoE supplying port associated with the port number designated as the override key port in entry event override field 210 is polled to confirm that no valid PD is connected to the TO 80 associated therewith.

In the event that in stage 1020 the override event is not active, in stage 1030 selected ports are enabled or disabled in accordance with a pre-determined schedule. In an exemplary embodiment the ports are selected and the schedule determined using user interface 200 described above in relation to FIG. 3.

In stage 1040, an entry event is monitored and the time clock is further monitored. In one embodiment the entry event is a report from an access control system, such as access control system 110 of FIG. 2, that an authorized user has entered the premises. In another embodiment the entry event is a report from an area lighting control, such as area lighting control 120 of FIG. 2, that illumination for an area has been energized. In yet another embodiment the entry event is a report from an area illumination sensor, such as area illumination sensor 130 of FIG. 2, that illumination in an area has been detected. In yet another embodiment the entry event is the detection of a PD connected to a designated TO, such as TO 80 of FIG. 1. In one embodiment the clock monitoring is accomplished by an interrupt set at a predetermined interval.

In stage 1050 the entry event monitored in stage 1040 is examined. In the event the selected entry event has been detected, in stage 1070 the selected ports disabled in stage 1030 in accordance with the pre-determined schedule are enabled, thereby overriding the scheduled disabling. It is to be understood that there is no requirement that all disabled ports of the system be overridden, or that all disabled ports be overridden responsive to a single entry event. The use of zones, or a plurality of sets of ports which are disabled according to a pre-determined schedule and the sets are respectively enabled by a predetermined associated entry event is specifically contemplated as part of the invention.

In stage 1080 the entry event of stage 1050 is monitored to determine whether the entry event remains active or has concluded. In one embodiment conclusion of the entry event is a report from access control system 110 of FIG. 2A or 2B that the authorized visitor has departed. In another embodiment conclusion of the entry event is a report from area lighting control 120 of FIG. 2A or area lighting control 125 of FIG. 2B, indicating that the illumination event has been terminated. In yet another embodiment conclusion of the entry event is a report from area illumination sensor 130 of FIG. 2A that the illumination is no longer present. In yet another embodiment conclusion of the entry event is the detection that a PD has been disconnected from the designated TO, such as TO 80 of FIG. 1.

The above has been described for an embodiment in which the entry event and the conclusion thereof are for the same event. This is not meant to be limiting in any way, and is specifically meant to include using a combination of events, or one or more events for entry and one or more different events for the conclusion of the entry event.

In stage 1090 the entry event monitored in stage 1080 is examined. In the event the conclusion of the entry event has been detected, stage 1030 as described above is performed. In the event the conclusion of the entry event has not been detected, stage 1080 described above is again performed. It is to be noted that preferably the clock need not be monitored as no port disabling will occur due to the entry event irrespective of the clock, however this is not meant to be limiting in any way. In another embodiment, the clock is examined as certain ports may be disabled irrespective of the status of the entry event.

In the event that in stage 1020 the override event is active, stage 1070 as described above is performed. In this manner the scheduled disabling is not begun until the entry event is concluded. Thus, for example, ports will not be disabled according to the schedule, as described in relation to stage 1030, while an authorized employee remains on site.

In the event that in stage 1050 the selected entry event has not been detected, in stage 1060 the clock monitored in stage 1040 is examined to determine if a scheduled change in port enabling or disabling is required due to the advancing of the clock. For example, in accordance with user interface 200 of FIG. 3, only on the hour are changes enabled. In the event that a time schedule change is detected, stage 1030 as described above is performed. In the event that in stage 1060 a time schedule change is not detected, stage 1040 as described above is again performed, preferably after a predetermined delay.

Figure 5:
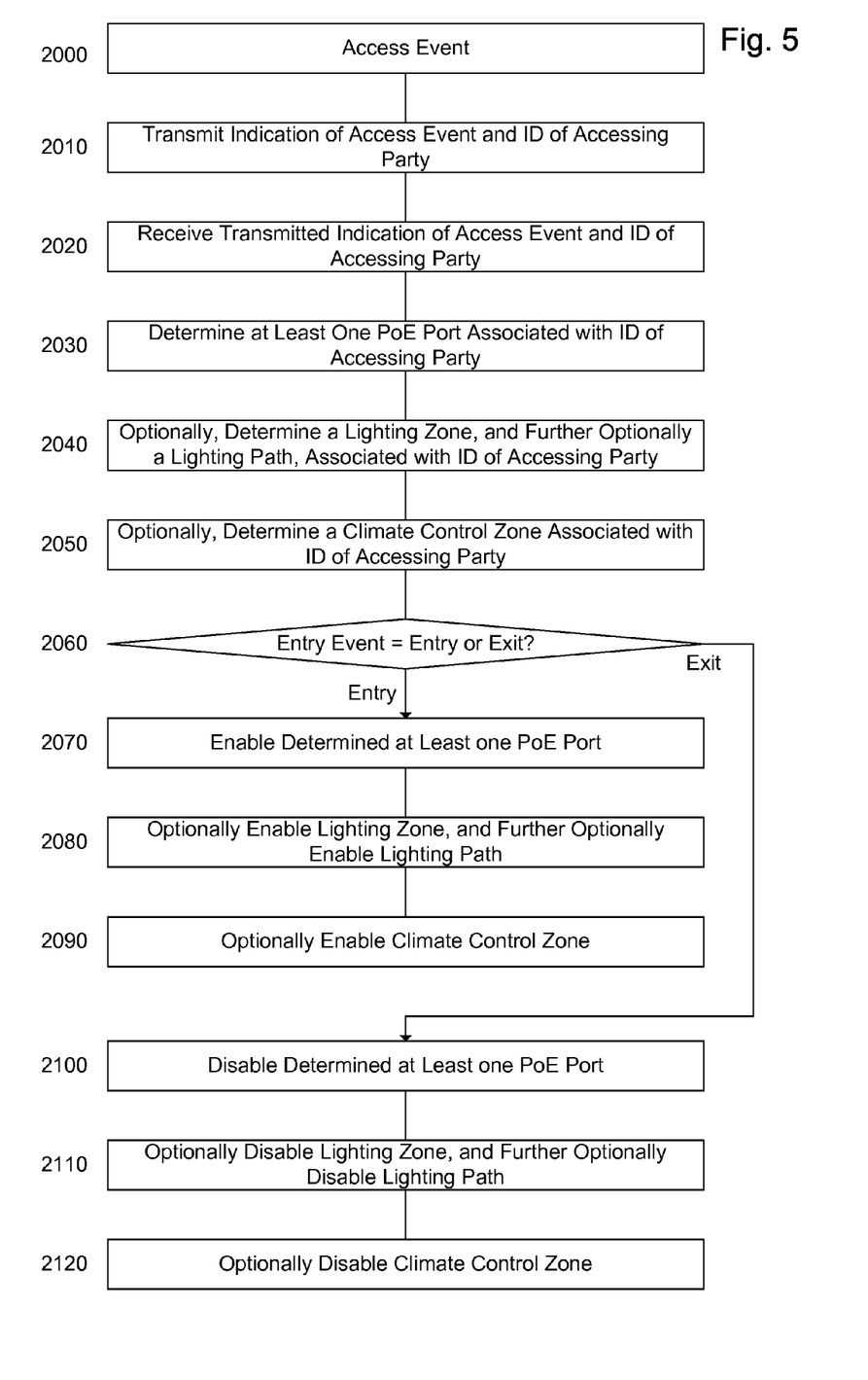
FIG. 5 is a high level flow chart of the operation of the management workstation of FIG. 2B to alternately enable and disable at least one PoE port responsive to the access control system.

FIG. 5 illustrates a high level flow chart of the operation of management workstation 20 of FIG. 2B to alternately enable and disable at least one PoE port responsive to the access control system. In stage 2000, an access event is detected, preferably by access control system 110. In stage 2010, an indication of the access event, in particular whether it is an entry or an exit event, and an identifier of the accessing party, is transmitted. Preferably the indication and identifier are transmitted by access control system 110.

In stage 2020, the transmitted indication of the access event, in particular whether it is an entry or an exit event, and the identifier of the accessing party, is received at management workstation 20. In stage 2030, preferably in cooperation with database 160, at least one PoE port associated with the identifier of the accessing party is determined. In optional stage 2040, a lighting zone associated with the identifier of the accessing party is determined, preferably in cooperation with database 160. Further optionally a lighting path from the access event location is determined, preferably in cooperation with database 160. In optional stage 2050, a climate control zone associated with the identifier of the accessing party is determined, preferably in cooperation with database 160.

In stage 2060, the received indication of the access event of stage 2020 is examined to determine if the access event is an entry event or an exit event. In the event that it is in an entry event, in stage 2070, the determined at least one PoE port of stage 2030 is enabled. Additionally, in optional stage 2080, the determined lighting zone, and further optional lighting path, of optional stage 2040 is enabled, preferably in cooperation with area lighting control 125. Additionally, in optional stage 2090, the determined climate control zone of optional stage 2050 is enabled, preferably in cooperation with climate control system 170.

In the event that in stage 2060 the received indication of the access event of stage 2020 is of an exit event, in stage 2100, the determined at least one PoE port of stage 2030 is disabled. Additionally, in optional stage 2110, the determined lighting zone, and further optional lighting path, of optional stage 2040 is disabled, preferably in cooperation with area lighting control 125. Additionally, in optional stage 2120, the determined climate control zone of optional stage 2050 is disabled, preferably in cooperation with climate control system 170.

The term disable as regarding climate controlled zones is not meant to be limited to completely disabling the system or zone. In one embodiment the range of allowed temperatures during access events when the system is enabled is controlled to be within a first predetermined range, and the range of allowed temperatures when the system is disabled is controlled to be within a second predetermined range.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. An electronically implemented method of controlled enabling and disabling of ports, the method comprising:

receiving a message responsive to an access event, said message comprising an identifier of the accessing party and an indication of the access event;

determining at least one power over Ethernet supplying port associated with said identifier of the accessing party; and enabling, in the event said indication of the access event is of entry, said determined at least one power over Ethernet supplying port associated with said identifier of the accessing party; and
disabling, in the event said indication of the access event is of exit, said determined at least one power over Ethernet supplying port associated with said identifier of the accessing party.

2. An electronically implemented method according to claim 1, further comprising:
determining a lighting zone associated with said identifier of the accessing party; and
enabling, in the event said indication of the access event is of entry, said determined lighting zone associated with said identifier of the accessing party; and
disabling, in the event said indication of the access event is of exit, said determined lighting zone associated with said identifier of the accessing party.

3. An electronically implemented method according to claim 1, further comprising:
determining a lighting zone associated with said identifier of the accessing party and a lighting path from the location of said access event to said determined lighting zone; and
enabling, in the event said indication of the access event is of entry, said determined lighting zone associated with said identifier of the accessing party and said lighting path; and
disabling, in the event said indication of the access event is of exit, said determined lighting zone associated with said identifier of the accessing party and said lighting path.

4. An electronically implemented method according to claim 1, further comprising:
determining a climate control zone associated with said identifier of the accessing party; and
enabling, in the event said indication of the access event is of entry, climate control of said climate control zone associated with said identifier of the accessing party; and
disabling, in the event said indication of the access event is of exit, climate control of said climate control zone associated with said identifier of the accessing party.

5. A system for powering responsive to an access control system, comprising:
a plurality of power over Ethernet supplying ports;
a management workstation in communication with each of said plurality of power over Ethernet supplying ports and with an access control system; and
a database in communication with said workstation, said database comprising:
identification information of a plurality of accessing parties, said identification information consonant with data output by the access control system; and
device and port information for at least one particular power over Ethernet supplying port associated with each of said plurality of accessing parties,
said management workstation being operative to:
receive a message from said access control system responsive to an access event, said message comprising an identifier of the accessing party and an indication of the access event;
retrieve from said database device and port information for at least one particular power over Ethernet supplying port associated with said accessing party; and
enable, in the event said indication of the access event is of entry, said determined at least one power over Ethernet supplying port associated with said identifier of the accessing party; and
disable, in the event said indication of the access event is of exit, said determined at least one power over Ethernet supplying port associated with said identifier of the accessing party.

6. A system according to claim 5, further comprising:
a lighting control in communication with said management workstation,
wherein said database further comprising lighting zone information associated with said accessing party, and
wherein said management workstation is further operative responsive to said received message from said access control system to:
retrieve from said database said lighting zone information associated with said accessing party;
enable, in the event said indication of the access event is of entry, said determined lighting zone associated with said identifier of the accessing party; and
disable, in the event said indication of the access event is of exit, said determined lighting zone associated with said identifier of the accessing party.

7. A system according to claim 5, further comprising:
a lighting control in communication with said management workstation,
wherein said database further comprising lighting zone information associated with said accessing party and lighting path information from the location of said access event to said determined lighting zone, and
wherein said management workstation is further operative responsive to said received message from said access control system to:
retrieve from said database said lighting zone information associated with said accessing party and said lighting path information;
enable, in the event said indication of the access event is of entry, said determined lighting zone associated with said identifier of the accessing party and said lighting path; and
disable, in the event said indication of the access event is of exit, said determined lighting zone associated with said identifier of the accessing party and said lighting path.

8. A system according to claim 5, further comprising:
a climate control system in communication with said management workstation,
wherein said database further comprising climate control zone information associated with said accessing party, and
wherein said management workstation is further operative responsive to said received message from said access control system to:
retrieve from said database said climate control zone information associated with said accessing party;
enable, in the event said indication of the access event is of entry, said determined climate control zone associated with said identifier of the accessing party; and
disable, in the event said indication of the access event is of exit, said determined climate control zone associated with said identifier of the accessing party.

* * * * *